Sept. 20, 1966 J. A. MOORE 3,273,730

SCOOP CONVEYOR APPARATUS

Filed Jan. 27, 1965 3 Sheets-Sheet 1

INVENTOR
JOSEPH A. MOORE
BY
Dick & Zarley
ATTORNEYS

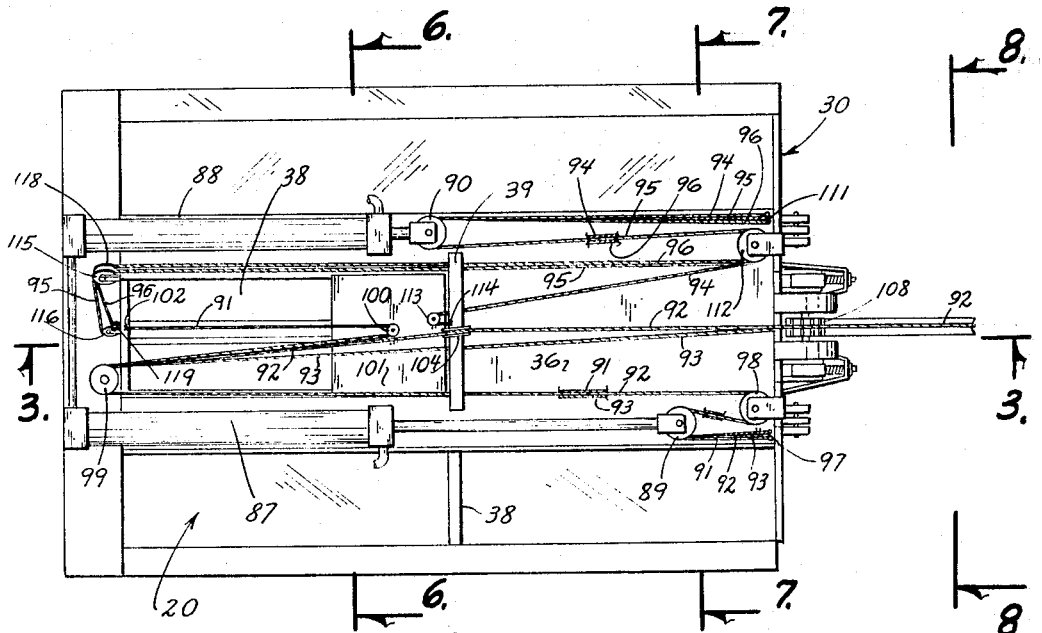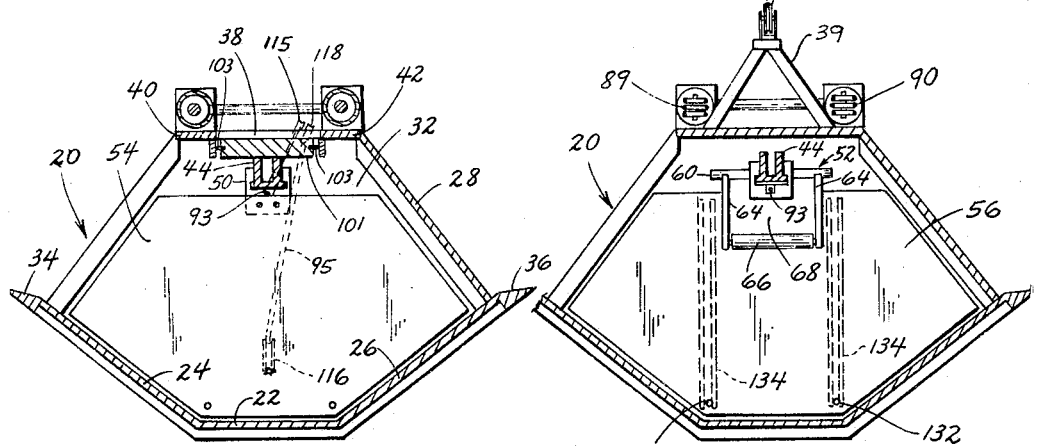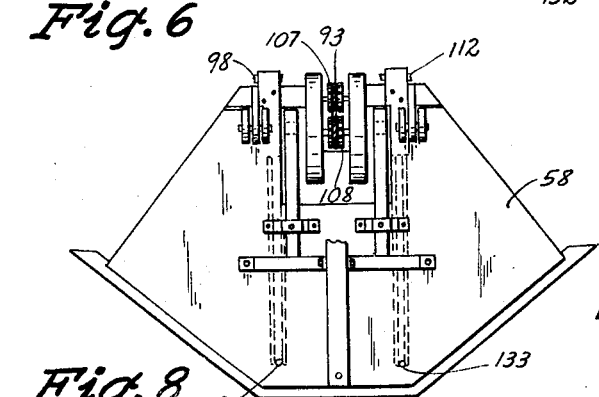

Sept. 20, 1966  J. A. MOORE  3,273,730
SCOOP CONVEYOR APPARATUS
Filed Jan. 27, 1965  3 Sheets-Sheet 3
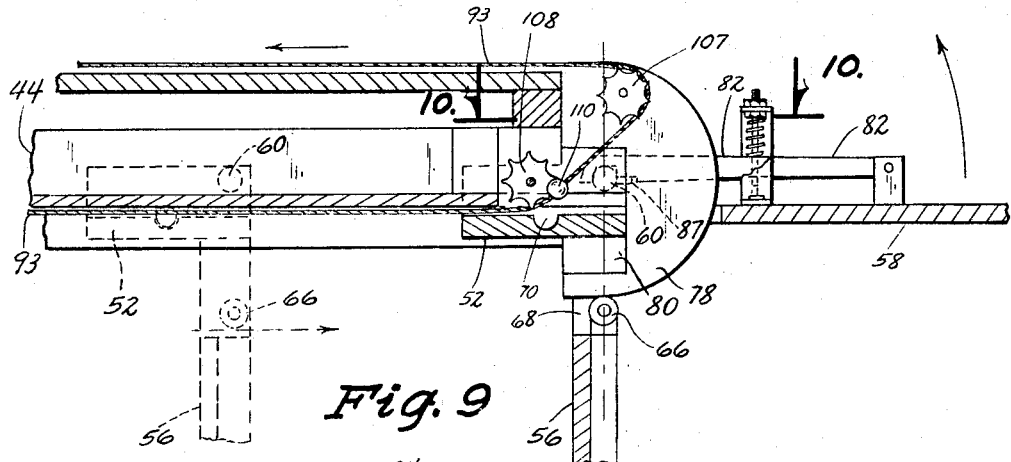
Fig. 9
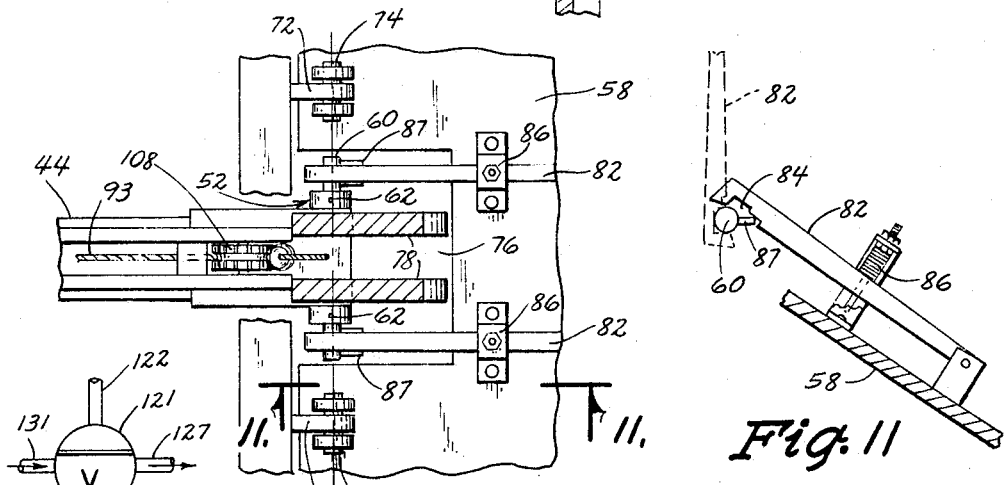
Fig. 10
Fig. 11
Fig. 13
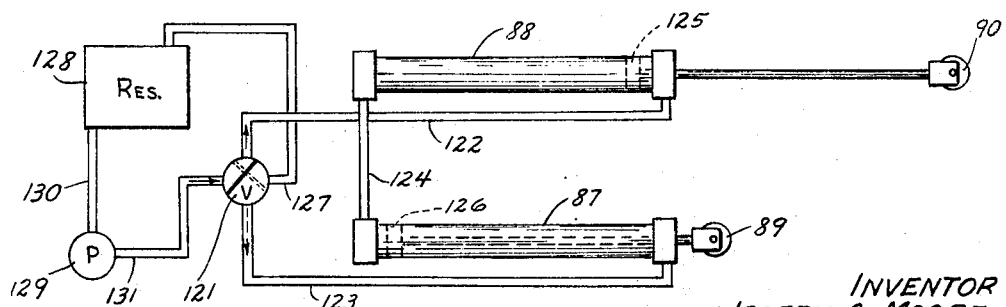
Fig. 12
INVENTOR
JOSEPH A. MOORE
BY
Dick & Zarley
ATTORNEYS

# United States Patent Office 3,273,730
Patented Sept. 20, 1966

3,273,730
SCOOP CONVEYOR APPARATUS
Joseph A. Moore, Boone, Iowa, assignor of forty-five percent to Vern T. Pritchard, Boone, Iowa
Filed Jan. 27, 1965, Ser. No. 428,487
14 Claims. (Cl. 214—146)

This invention relates to a scoop and in particular to a scoop having unloading means integrally associated therewith.

It is a principal object of this invention to provide a scoop conveyor which may readily be filled and just as readily unloaded.

A related object of this invention is to provide a scoop conveyor having an unloading conveyor assembly which is adapted to move transversely of the direction from which the material being loaded enters the scoop.

A still further related object of this invention is to provide a scoop having an unloading conveyor means wherein a plurality of paddles are adapted to move lengthwise of the scoop to an unloading position at one end thereof.

A still further related object of this invention is to provide a scoop having conveyor means which moves in one direction for unloading and in the opposite direction to its loading position.

It is a still further object of this invention to provide a scoop conveyor having at least three paddles, one at each end and one in between wherein the paddle at the unloading end of the scoop and the intermediate paddle are adapted to pivot upwardly to present an unobstructed opening for discharge of material from the scoop as the paddle at the opposite end thereof moves toward the discharge end.

Another related object of this invention is to provide a scoop conveyor having a plurality of paddles wherein one of said paddles is movable on a supporting rail by a cable means which automatically is disengaged therefrom when said paddle reaches the discharge end of the scoop and is re-engaged with said cable for returning said paddle to its loading position.

A further object of this invention is to provide a scoop conveyor apparatus which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 5 is a top plan view of the scoop conveyor;

FIG. 6 is a transverse cross-sectional view taken along line 6—6 in FIG. 5;

FIG. 7 is a transverse cross-sectional view taken along line 7—7 in FIG. 5;

FIG. 8 is an end elevation view taken along line 8—8 in FIG. 5;

FIG. 9 is an enlarged fragmentary longitudinal cross-sectional view of the discharge end of the scoop illustrating in particular the intermediate paddle in several of its positions as it moves toward the discharge end of the scoop;

FIG. 10 is a top cross-sectional view taken along line 10—10 in FIG. 9;

FIG. 11 is a side elevational view of the discharge end paddle in tis partially open position as taken along line 11—11 in FIG. 10;

FIG. 12 is a schematic view of the hydraulic power system for operating the paddle conveyor assembly; and FIG. 13 is a fragmentary view of the control valve of FIG. 12 illustrating it in particular in its open, non-operating position.

Figure 1:
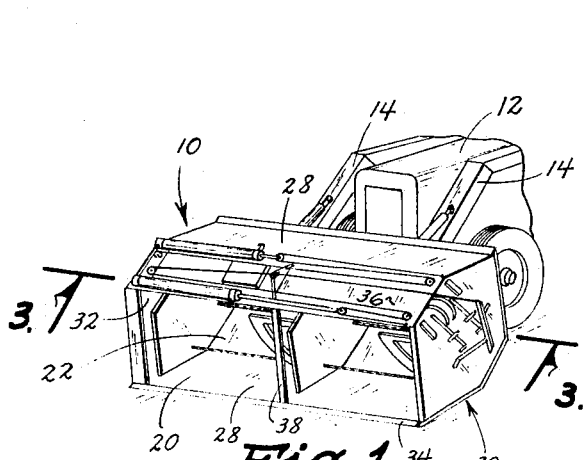
FIG. 1 is a front perspective view of the conveyor scoop mounted on the front end of a tractor-type vehicle.
Figure 2:
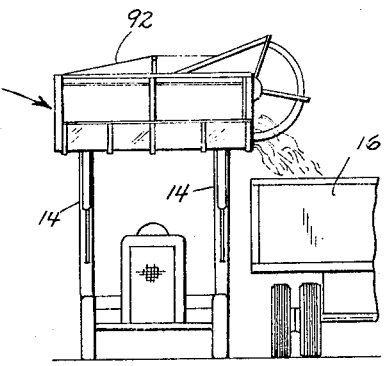
FIG. 2 is a front elevation view of the scoop and tractor vehicle wherein the scoop is in a raised unloading position discharging material into a truck-type vehicle.

The scoop conveyor of this invention is referred to in FIGS. 1 and 2 generally by the reference numeral 10 and is shown mounted on the forward end of a tractor-type vehicle 12. A pair of lift arms 14 are provided on the tractor 12 for lifting the scoop 10 to a raised position for unloading into a truck-type vehicle 16 (FIG. 2).

Figure 3:
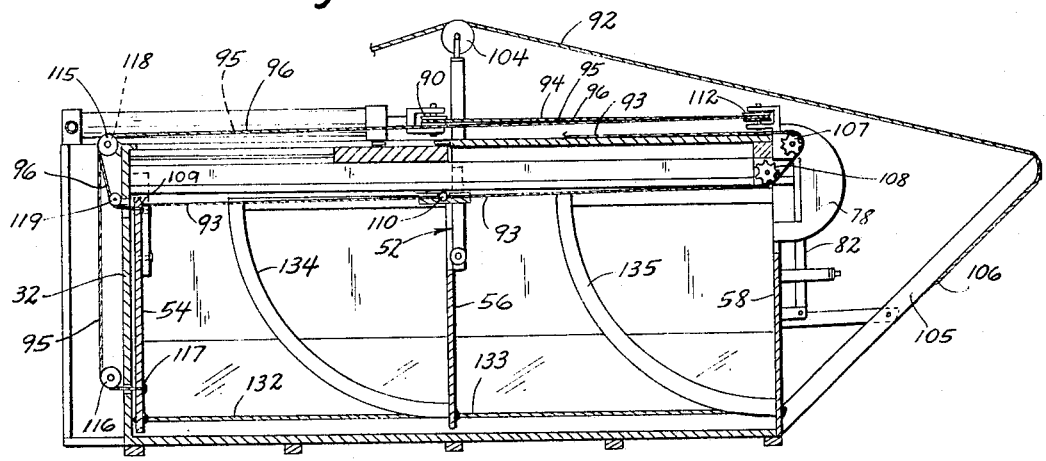
FIG. 3 is a longitudinal cross-sectional view taken along line 3—3 in FIG. 5 and showing in particular the paddle relationship when in its loading position.
Figure 4:
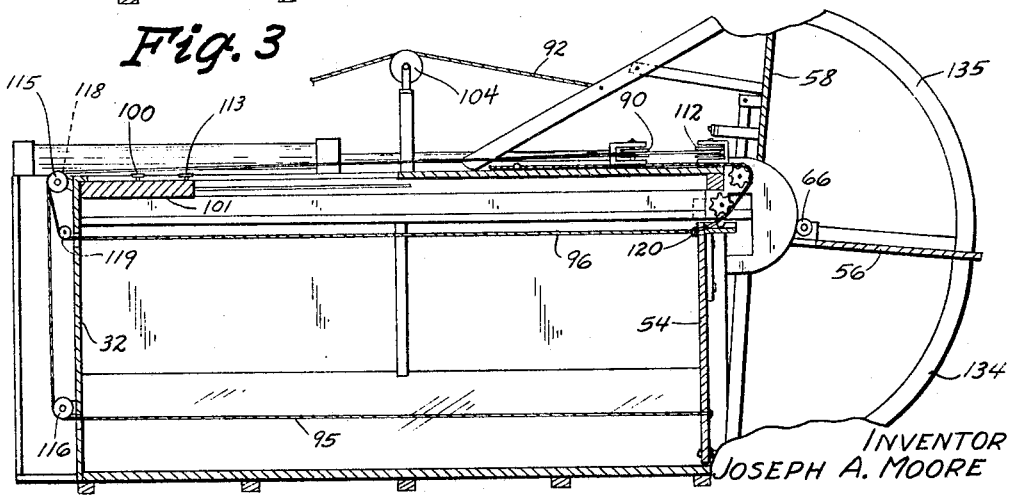
FIG. 4 is a view similar to FIG. 3 but illustrating in particular the paddles in their unloading positions.

As perhaps best seen in FIG. 1 and the transverse cross-sectional views 6 and 7 the scoop 10 has an elongated housing with a forward opened side 20 through which material enters to an elongated chamber 22 running the full length of the scoop 10. The bottom of the scoop is closed and includes a center portion 22 with outwardly and upwardly extending portions 24 and 26. The portion 26 terminates at its outer end in an upwardly and inwardly extending side wall 28 opposite the opening 20 which thereby closes the back side of the scoop. The discharge end of the scoop is referred to at 30 in FIGS. 1 and 5. At the opposite end from the discharge end 30 a vertical end wall 32 is provided (FIGS. 1, 3 and 4). To provide scraping edges, the longitudinal outer end edges 34 and 36 of the bottom wall portions 24 and 26 are tapered to a sharp edge (FIGS. 1, 6 and 7).

The top of the scoop 10 is closed by a wall section 36 (FIGS. 1 and 5) which extends from the discharge end 30 to the center of the scoop where a brace member 38 is positioned across the opening 20 and a top brace member 40 extends across the top side of the scoop. From the brace 40 to the rear end wall 32 the top side is open as indicated at 38 in FIG. 5. As seen in FIG. 6, the opening 38 is defined by the end wall 32 and a pair of spaced apart top frame angle members 40 and 42.

Extending from the end wall 32 and the discharge end 30 of the scoop 10 is a monorail 44 (FIGS. 6 and 7).

Connected to the monorail 44 are two carriage assemblies 50 and 52 which carry paddle members 54 and 56 respectively (FIGS. 6 and 7). A third paddle 58 is disposed at the discharge end 30 and will be described later in further detail. The carriage assembly 52 as best seen in FIGS 7 and 10 includes a shaft member 60 fixedly held thereto by screws 62. A pair of arms 64 are pivotally connected to the shaft 60 and extend downwardly therefrom where they are fixedly connected to the paddle 56. A roller 66 extends between the arms 60 and defines with the arms 60 an opening 68 in the paddle 56.

Referring to FIG. 9, it is seen that a hemispherical notch 70 is formed in the carriage 52 and faces upwardly toward the monorail 44.

On opposite sides of the monorail 44 (FIG. 10), arms 72 are provided which are pivotally connected through pins 74 to the discharge end paddle 58. This paddle has a cut out center portion 76 which is adapted to accommodate a pair of spaced apart semicircular guide plates 78 secured to the discharge end of the scoop frame and against which the roller 66 on the carriage 52 engages (FIG. 9). Also it is seen in FIG. 9 that the carriage 52 is limited in its travel towards the discharge end 30 by bearing against a notched out portion 80 in the guide plates 78.

Additionally, the discharge end paddle 58 includes a pair of spaced apart arms 82 having notches 84 at their upper free ends for detachable engagement with the shaft 60 on the carriage 52 as seen in FIGS. 9, 10 and 11. A spring means 86 is provided on the paddle 58 for maintaining the arms 82 in yieldable contact with the shaft 60 and an arm release element 87 extending horizontally outwardly from the shaft 60 is adapted to prevent locking engagement between the arms 82 and the shaft 60 until the paddle 58 and the arms 82 reach a horizontal or higher position as seen in FIG. 9 for example.

As is apparent from the description thus far, the paddles 54, 56 and 58 (FIGS. 3 and 4) are adapted to move back and forth along the length of the scoop 10 between the closed position of FIG. 3 and the open position of FIG. 4. This is accomplished by an opening hydraulic cylinder 87 and a closing cylinder 88 both of which are disposed on top of the scoop 10 (FIG. 5). A pulley 89 is connected to the outer end of the cylinder 87 and a pulley 90 is similarly connected to the outer end of the cylinder 88. Three cables, 91, 92 and 93 engage the pulley 89 while three other cables 94, 95 and 96 engage the pulley 90. The cables 91, 92 and 93 are anchored to the scoop frame at 97. Thus it is seen that cable 91 extends from the anchor point 97 around the sheave or pulley 89, over a pulley 98 then to the rear end of the scoop and around a pulley 99. Cable 91 then extends towards the discharge end 30 and around a pulley 100 mounted on a counter weight 101 (FIG. 5) where it then returns to an anchor 102 at the rear end of the scoop 10.

As seen in FIG. 6, the counter weight 101 is movably engaged by guide elements 103 formed on the downwardly extending flanges of the frame members 40 and 42 thereby permitting the counter weight to move from the center of the scoop 10 to the rear end thereof.

The cable 92 also extends around the pulleys 98 and 99 but then extends over a pulley 104 mounted on a standard 39 positioned centrally of the scoop 10 as seen for example in FIG. 7. The cable 92 then extends forwardly towards the discharge end 30 and outwardly thereof where it engages a grooved arm 105 extending angularly outwardly of the paddle 58 (FIG. 3). The cable 92 is anchored at 106 on the arm 105.

The third cable 93 also extends around the pulleys 98 and 99 and then as seen in FIGS. 3, 9 and 10, extends to the discharge end of the scoop and downwardly around a grooved gear 107, thence downwardly and rearwardly around a second grooved gear 108. From the grooved gear 108 the cable 93 passes into the carriage 52 and extends therethrough terminating at the paddle 54 where it is anchored at 109 on the paddle 54. A ball 110 is fixedly secured on the cable 93 for engagement with the hemispherical recess 70 in the carriage 52 and also the grooved gears 107 and 108 (FIG. 9).

All of the cables 94, 95 and 96 are anchored at the discharge end 30 of the scoop at 111 (FIG. 5). The cable 94 extends from the anchor point 111 around the sheave 90 then around the pulley 112 and from there back to a pulley 113 on the counter weight 101. The cable 94 is then anchored to the frame at 114 (FIG. 5). Next, the cable 95 extends from the anchor point 111 around the pulley 90 and the pulley 112 to the rear end of the scoop 10 around a pulley 115 then downwardly around a pulley 116. The cable 95 then extends through the rear end wall 32 and is anchored at 117 to the lower end of the rear paddle 54 (FIG. 3).

The cable 96 also extends around the pulleys 90, 112 and then engages a pulley 118 adjacent the pulley 115. The cable 96 also extends downwardly around a pulley 119 (FIG. 4) and forwardly through the rear wall 32 where it is anchored at 120 to the rear paddle 54.

Thus it is seen that the hydraulic cylinder 87 serves to move the paddles to their open positions illustrated in FIGS. 2 and 4 and the cylinder 88 serves to return them to their closed position of FIGS. 1, 3 and 5. A master control valve 121 (FIG. 12) has a line 122 extending to the forward end of the cylinder 88 and a line 123 similarly extending to the forward end of the cylinder 87. A hydraulic fluid line 124 connects the rear ends of the cylinders 87 and 88 and thus when fluid enters the forward end of cylinder 88 it forces the piston 125 rearwardly and the fluid therein through the line 124 to the rear end of the cylinder 87 thereby forcing the piston 126 outwardly in the cylinder 87. It is obvious that this flow of fluid is reversible. A line 127 extends from the valve 121 to a reservoir 128 which is connected to a pump 129 by a line 130. The pump 129 is in turn connected by a line 131 to the valve 121. As seen in FIG. 12 the valve in its solid line position permits fluid from the pump 129 to pass into the line 122 and thus to the forward end of the cylinder 88. But when the valve 121 is moved to its dash line position in FIG. 12 the fluid would flow to the forward end of the cylinder 87. As illustrated in FIG. 13, the valve is in its neutral or open position and thereby permits the pump 129 to return the fluid directly to the reservoir 128.

In FIGS. 3 and 4, connecting cables 132 extend between paddles 54 and 56 and cables 133 between paddles 58 and 56. The cables 132 as seen in FIGS. 7 and 8 are adapted to ride in the grooved arcuate guide members 134 when the intermediate paddle 56 is pivoted to its upwardly and outwardly extending position in FIG. 4. Similarly, the connecting cables 133 are adapted to ride in arcuate guide members 135.

In use, the scoop 10 would be filled from its position shown in FIG. 1 and raised to its position in FIG. 2 for discharging the material therefrom into a truck or the like 16. The material would enter the longitudinal side opening 20 and would be discharged from the discharge end opening 30.

To move the paddles 54, 56 and 58 to the discharge end the control valve 121 would be moved to its dash line position in FIG. 12 thereby causing the opening cables 92 and 93 to move the paddle members. The cable 92 as seen in FIG. 3 would tend to pivot the paddle member 58 about an axis through the pin element 74 (FIG. 10) to its position in FIG. 4. Likewise, the cable 93 connected at its rear end to the end paddle 54 will also move to the right as viewed in FIG. 3 and through its ball 110 engagement with the carriage 52 it will move the paddle 56 towards the discharge end 30. The ball 110 will be released from the carriage 52 as seen in FIG. 9 when the carriage 52 abuts against the members 78 and is free to pass out of the hemispherical recess 70. The cable 93 continues its movement thereby pulling the end paddle 54 to its final position of FIG. 4. Through the connection between paddles 56 and 58 by the connecting cables 133, the paddle 56 is pivoted upwardly to its substantially horizontal position of FIG. 4 and the paddle 54 assumes the vertical position previously held by the paddle 58 when in its loading position of FIG. 3. Simultaneous with this operation the counter weight 101 has moved from its center position of FIG. 3 to the rear position of FIG. 4 by the action of cable 91.

As best seen in FIGS. 9, 10 and 11, the downwardly spring biased arms 82 on the paddle 58 engage the shaft 60 when the paddle 58 reaches its horizontal position and thereby is provided with a pivotal guide for its further pivotal movement upwardly to its final position of FIG. 4. When the scoop 10 has been completely emptied and it is desired to return the paddles to their normal loading position of FIG. 3, the control valve 121 (FIG. 12) is moved to its solid line position thereby forcing the piston 125 to be retracted and accordingly pulling on the cables 94, 95 and 96. The cables 95 and 96 as illustrated in FIG. 4 are connected or anchored at the bottom and top edges of the rear paddle 54 and thereby through the connecting cables 132 and 133 (FIG. 3) pull the paddles 56 and 58 back to their normal loading position of FIG. 3. Similarly, the cable 94 returns the counter weight 101 to its position of FIG. 5. It is important to note that the ball 110 on the cable 93 re-enters the hemispherical recess 70 in the carriage 52 and thus is ready for use again upon reopening the scoop. Also, the paddle 56 and the associated carriage 52 cannot move to the left or rearward until the arms 82 have been disengaged from the shaft 60. This occurs when the paddle 58 has reached the horizontal position in its downwardly travel whereby the release element 87 moves the arms 82 upyardly off the shaft 60 against the action of the springs 86. At this point, the carriage 52 and the paddle 56 are free to travel to the left to their normal position of FIG. 3. From viewing FIG. 10, it will be appreciated that the pivotal axis for the paddle 58 extends through the pin 74 and the shaft 60.

The scoop conveyor hereindescribed is capable of loading and unloading quickly large quantities of material such as grain, coal or snow or the like. It is apparent that it can be mounted on any type of machine and the principal operation would be the same.

Some changes may be made in the construction and arrangement of my scoop conveyor apparatus without departing from the real spirit and purpose of my invention, and it is my intention to cover by my claims, any modified forms of structure or use of mechanical equivalents which may be reasonably included within their scope.

I claim:
1. In a material scoop conveyor, comprising in combination,
   a vehicle,
   a scoop mounted on said vehicle, said scoop being so positioned on said vehicle such that the longitudinal axis of said scoop extends transversely of the line of travel of said vehicle, and said scoop having an outlet opening at one end and an inlet opening on one side, said one side being outwardly of said vehicle,
   unloading means on said scoop movable along the longitudinal axis of said scoop to discharge material through said outlet opening, and said unloading means includes a plurality of paddles disposed in spaced relationship along the length of said scoop when said unloading means is in a loading position and positioned at said one end of said scoop when in an unloading position, said paddles adapted to discharge material from said scoop upon being moved fro msaid loading position to said unloading position

2. In a material scoop conveyor, comprising in combination,
   a vehicle,
   a scoop mounted on said vehicle, said scoop being so positioned on said vehicle such that the longitudinal axis of said scoop extends transversely of the line of travel of said vehicle, and said scoop having an outlet opening at one end and an inlet opening on one side, said one side being outwardly of said vehicle,
   unloading means on said scoop movable along the longitudinal axis of said scoop to discharge material through said outlet opening, and said unloading means includes a paddle at each end of said scoop and one therebetween when said unloading means is in loading position and all of said paddles positioned at one end of said scoop when in an unloading position.

3. In a material scoop conveyor, comprising in combination,
   a vehicle,
   a scoop mounted on said vehicle, said scoop being so positioned on said vehicle such that the longitudinal axis of said scoop extends transversely of the line of travel of said vehicle, and said scoop having an outlet opening at one end and an inlet opening on one side, said one side being outwardly of said vehicle,
   unloading means on said scoop movable along the longitudinal axis of said scoop to discharge material through said outlet opening, and said unloading means includes a paddle at each end of said scoop and one therebetween when said unloading means is in loading position and all of said paddles positioned at one end of said scoop when in an unloading position, said paddle at one end of said scoop being pivotally connected to said scoop and adapted to move from a downwardly extending loading position to an upwardly extending unloading position.

4. In a material scoop conveyor, comprising in combination,
   a vehicle,
   a scoop mounted on said vehicle, said scoop being so positioned on said vehicle such that the longitudinal axis of said scoop extends transversely of the line of travel of said vehicle, and said scoop having an outlet opening at one end and an inlet opening on one side, said one side being outwardly of said vehicle,
   unloading means on said scoop movable along the longitudinal axis of said scoop to discharge material through said outlet opening, and said unloading means includes a paddle at each end of said scoop and one therebetween when said unloading means is in loading position and all of said paddles positioned at one end of said scoop when in an unloading position, said paddle at one end of said scoop being pivotally connected to said scoop and adapted to move from a downwardly extending loading position to an upwardly extending unloading position, said intermediate paddle adapted to pivot outwardly of said one end when in said unloading position.

5. In a material scoop conveyor, comprising in combination,
   a vehicle,
   a scoop mounted on said vehicle, said scoop being so positioned on said vehicle such that the longitudinal axis of said scoop extends transversely of the line of travel of said vehicle, and said scoop having an outlet opening at one end and an inlet opening on one side, said one side being outwardly of said vehicle,
   unloading means on said scoop movable along the longitudinal axis of said scoop to discharge material through said outlet opening, and said unloading means includes a paddle at each end of said scoop and one therebetween when said unloading means is in loading position and all of said paddles positioned at one end of said scoop when in an unloading position, said paddle at one end of said scoop being pivotally connected to said scoop and adapted to move from a downwardly extending loading position to an upwardly extending unloading position, said intermediate paddle adapted to pivot outwardly of said one end when in said unloading position, and said paddle at the other end of said scoop when in said unloading position being substantially in the position of said paddle at said one end scoop when in its loading position.

6. In a material scoop conveyor, comprising in combination,
   a vehicle,
   a scoop mounted on said vehicle, said scoop being so positioned on said vehicle such that the longitudinal axis of said scoop extends transversely of the line of travel of said vehicle, and said scoop having an outlet opening at one end and an inlet opening on one side, said one side being outwardly of said vehicle,
   unloading means on said scoop movable along the longitudinal axis of said scoop to discharge material through said outlet opening, and said unloading means includes a paddle at each end of said scoop and one therebetween when said unloading means is in loading position and all of said paddles positioned at one end of said scoop when in an unloading position, and a supporting rail means extending lengthwise of said scoop, a carriage movable on said rail, said intermediate paddle between said end paddles connected to said carriage, cable means detachably connected to said carriage for moving it along said rail, said cable being connected to said paddle at said other end for moving it to said unloading position, cooperating means on said cable and said carriage for disconnecting said cable from said carriage upon said carriage being moved to said one end of said scoop whereby said cable may continue to move said paddle at said other end towards said one end.

7. The structure of claim 6 and flexible means for interconnecting in series the lower ends of said end and intermediate paddles.

8. The structure of claim 6 and means for pivoting upwardly and outwardly said paddle at said one end, flexible means for interconnecting the lower ends of said end and intermediate paddles whereby said intermediate paddle pivots upwardly and outwardly upon said cable being disconnected from said carriage and said paddle at said other end continues to move towards said one end to said unloading position.

9. The structure of claim 8 and guide means is provided at said one end having a curved outer surface with a center axis co-extensive with the axis of pivotal movement for said intermediate paddle at said one end as it pivots outwardly and upwardly, and roller means on said intermediate paddle for movable engagement with said guide means as said intermediate paddle pivots upwardly and outwardly.

10. The structure of claim 6 and a shaft is provided on said carriage means; said shaft having a longitudinal axis extending coaxially of the axis of pivotal movement for said intermediate paddle, and at least one arm on said paddle at said one end for detachable pivotal engagement with said shaft upon said carriage and said intermediate paddle moving to said unloading position.

11. The structure of claim 6 and a shaft is provided on said carriage means; said shaft having a longitudinal axis extending coaxially of the axis of pivotal movement for said intermediate paddle, and at least one arm on said paddle at said one end for detachable pivotal engagement with said shaft upon said carriage and said intermediate paddle moving to said unloading position, release means on said shaft so arranged that said arm is in yieldable locking engagement with said shaft when said paddle and arm are extending horizontally to positions upwardly therefrom and said release means unlocks said arm from said shaft as said paddle and arm pivot downwardly of a horizontal position towards said loading position.

12. A material conveyor comprising,
a box having an outlet opening at one end, and
unloading means in said box movable along the longitudinal axis of said box to discharge material through said outlet opening,
a rail extending lengthwise of said box,
said unloading means includes a paddle at each end of said box and one therebetween when said unloading means is in loading position and all of said paddles positioned at one end of said box when in an unloading position, said paddle at one end of said box being pivotally connected to said box and adapted to move from a downwardly extending loading position to an upwardly extending unloading position, said intermediate paddle adapted to pivot outwardly of said one end when in said unloading position, said paddle at the other end of said box and said intermediate paddle being movably mounted on said rail.

13. A material conveyor, comprising,
a box having an outlet opening at one end, and
unloading means in said box movable along the longitudinal axis of said box to discharge material through said outlet opening,
a rail extending lengthwise of said box,
said unloading means include a paddle at each end of said box and one therebetween when said unloading means is in loading position and all of said paddles positioned at one end of said box when in an unloading position, said paddle at one end of said box being pivotally connected to said box and adapted to move from a downwardly extending loading position to an upwardly extending unloading position, said intermediate paddle adapted to pivot outwardly of said one end when in said unloading position, and said paddle at the other end of said box when in said unloading position being substantially in the position of said paddle at said one end of said box when in its loading position, said paddle at the other end of said box and said intermediate paddle being movably mounted on said rail.

14. A material conveyor, comprising,
a box having an outlet opening at one end, and
unloading means in said box movable along the longitudinal axis of said box to discharge material through said outlet opening,
said unloading means includes a paddle at each end of said box and one therebetween when said unloading means is in loading position and all of said paddles positioned at one end of said box when in an unloading position, and a supporting rail means extending lengthwise of said box, a carriage movable on said rail, said intermediate paddle between said end paddles connected to said carriage, cable means detachably connected to said carriage for moving it along said rail, said cable being connected to said paddle at said other end for moving it to said unloading position, cooperating means on said cable and said carriage for disconnecting said cable from said carriage upon said carriage being moved to said one end of said box whereby said cable may continue to move said paddle at said other end towards said one end.

References Cited by the Examiner
UNITED STATES PATENTS

| | | | |
|---|---|---|---|
| 2,101,882 | 12/1937 | Vessey | 214—82 |
| 2,204,033 | 6/1940 | Austin. | |
| 2,709,532 | 5/1955 | Marietta | 214—514 |
| 3,121,502 | 2/1964 | Schroeder | 214—510 X |

HUGO O. SCHULZ, *Primary Examiner.*